No. 703,916. Patented July 1, 1902.
J. T. HALEY.
ORANGE OR LEMON CLEANER.
(Application filed Nov. 3, 1900.)
(No Model.) 2 Sheets—Sheet 1.
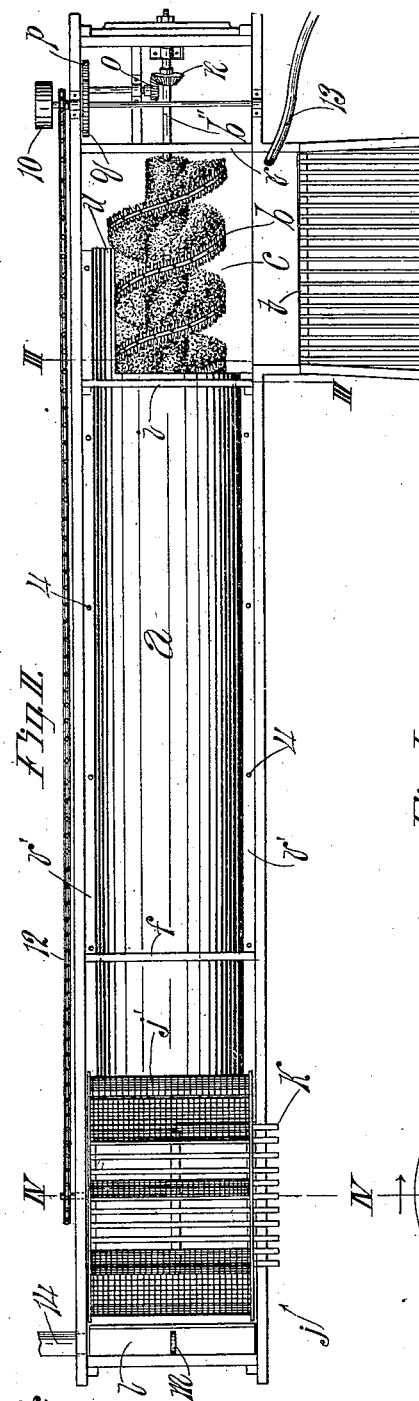
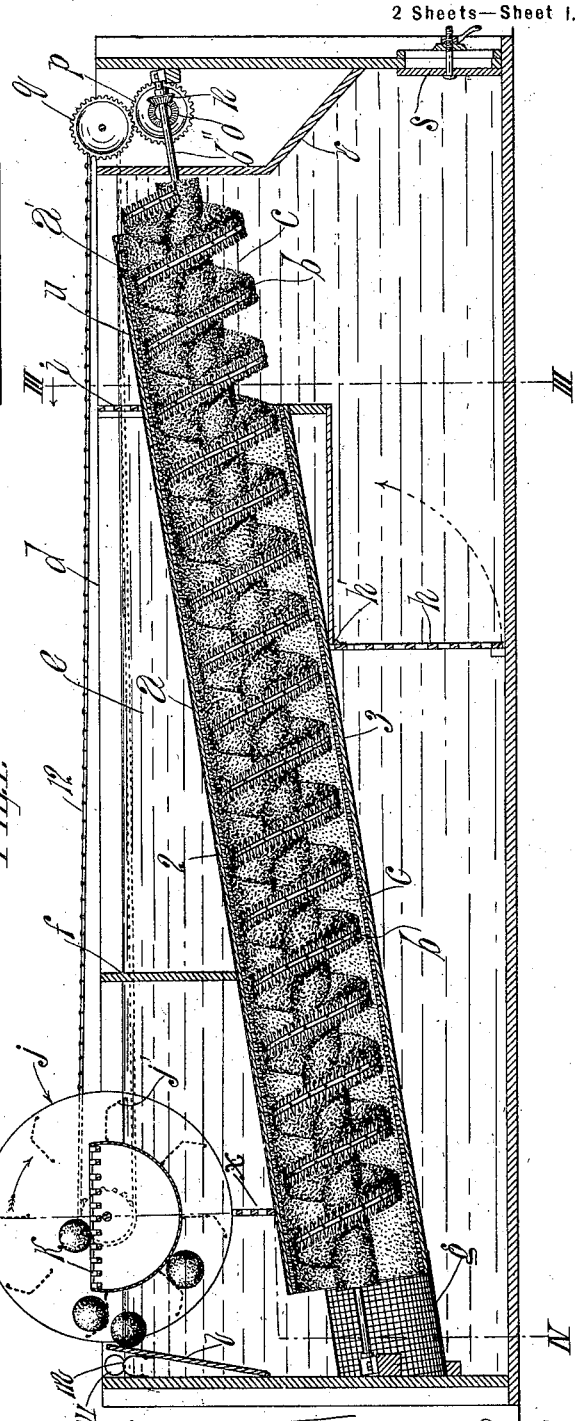

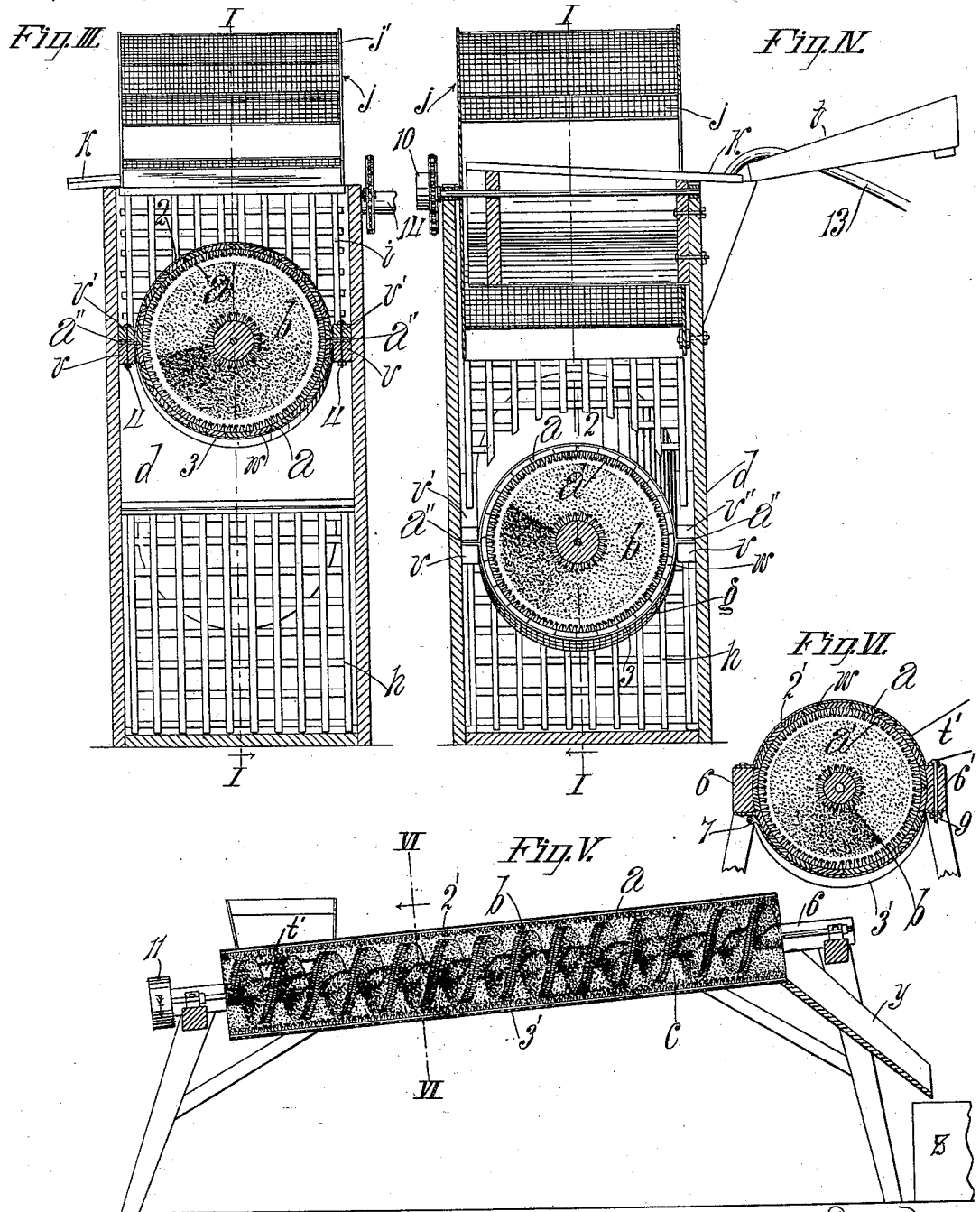

UNITED STATES PATENT OFFICE.

JAMES T. HALEY, OF ALHAMBRA, CALIFORNIA.

ORANGE OR LEMON CLEANER.

SPECIFICATION forming part of Letters Patent No. 703,916, dated July 1, 1902.

Application filed November 3, 1900. Serial No. 35,420. (No model.)

*To all whom it may concern:*

Be it known that I, JAMES T. HALEY, a citizen of the United States, residing at Alhambra, in the county of Los Angeles and State of California, have invented a new and useful Orange or Lemon Cleaner, of which the following is a specification.

The object of my invention is to provide an efficient machine for cleansing large quantities of oranges, lemons, and other fruits of like character without bruising or injuring the same.

An object of this invention is to avoid any irregular or forceful spring-pressure or other pressure upon the fruit while the same is being operated upon.

My invention is a brushing-machine and may be successfully operated both with and without water.

My invention comprises a hollow cylinder furnished on its inside wall with a brush-surface and a screw having brush-surfaces and mounted to rotate inside the hollow cylinder and having between its brush-formed threads ample space for the passage of the fruit. The cylinder and screw when used for dry brushing may be placed in any position from horizontal to any desired angle of inclination, and the fruit will be fed in at one end of the cylinder while the screw is rotated to convey it to the other end of the cylinder.

When used with water, the invention comprises, in combination with said cylinder, which is set aslant, a screw set aslant in the cylinder and a water-tank containing water, in which the screw and cylinder are immersed.

My invention includes the various features, combinations, and parts hereinafter described and claimed.

The accompanying drawings illustrate my invention.

Figure I is a vertical longitudinal section of a machine embodying my invention as applied for use with water. The hollow cylindrical brush is shown in longitudinal midsection, while the screw-brush is shown intact. Fig. II is a plan of the machine shown in Fig. I. Fig. III is a section of the machine on line III III, Figs. I and II, looking to the left. Fig. IV is a cross-sectional elevation on line IV IV, Figs. I and II, looking to the right. Fig. V is a view of the invention in one form in which it is applied for use without water. Fig. VI is a cross-section on line VI VI, Fig. V, looking to the left.

$a$ indicates the hollow cylindrical brush. $a'$ indicates the brush-surface on the inside of said cylindrical brush.

$b$ indicates the brush screw conveyer. The space $c$ between the threads $b$ of this conveyer is preferably about six inches wide, the diameter of the brush being preferably about seventeen inches, while the internal diameter of the brush-cylinder is about eighteen inches, so as to leave plenty of clearance between the threads of the screw and the walls of the cylindrical brush. With these dimensions the total length of the cylinder should be about eleven or twelve feet; but it is to be understood that I do not limit myself to any particular dimensions. The dimensions may be readily determined by the constructor to satisfy the conditions to be met in any particular case.

Where dry brushing is to be applied, the cylinder and screw may be placed horizontally or at any suitable slant, and the screw will be rotated to carry the fruit from one end to the other of the cylinder. In case the cylinder and screw are set aslant the screw in the dry brusher must be rotated to carry the fruit upward.

For washing with water the cylinder $a$ is set aslant in a tank $d$ of water, and said tank will be filled with water sufficiently to practically immerse the screw and the cylinder, and the screw will be rotated to convey the fruit from the upper end to the lower end of the cylinder, where it will be discharged considerably below the level of the water $e$ in the tank $d$. The water must not come above the top of the upper end of the cylinder when the machine is in operation, and in practice the fruit will be poured into the water at the upper end of the cylinder, and the rotation of the screw will gather the fruit thus poured into the tank and will conduct it downward through the cylinder to the lower end. The rotation of the screw creates a powerful forced current, by which the fruit and water are carried through the cylinder, so that at the discharge end of the tank the level of the water will be raised considerably above the level of the water at the head end of the tank when the machine is in operation.

*f* indicates a partition or water-wall extending across the tank near the discharge end of the cylinder and above the cylinder.

*g* indicates a grating at the discharge end of the cylinder, over which the fruit is discharged from the cylinder. This grating prevents any fruit from being carried back by the force of the water returning to the head of the cylinder under the action of the force of gravity. While the machine is in operation there will be a constant and vigorous circulation of water through the cylinder from the feed end to the discharge end and thence back beneath the cylinder and up to the feed end of the cylinder. This circulation beneath the cylinder is increased by means of the water-wall *f*.

*h* indicates a grating door or screen to prevent too great a quantity of fruit from being fed in at the head end of the tank. This door prevents the fruit from working toward the discharge end of the tank when the attendant feeds the fruit into the machine too rapidly; otherwise the attendant might fill the entire space beneath the cylinder with oranges and keep the fruit too long in the water.

*i* indicates a grating above the cylinder to prevent any fruit from floating away from the feed end of the cylinder.

*j* indicates an elevator for lifting the cleaned fruit and discharging it from the tank. This elevator consists in a wheel having foraminous buckets or dippers *j'*, directed to discharge onto a centrally-arranged floor *k*, onto which the fruit will be rolled as the buckets pass upward when the elevator-wheel *j* is rotated in the direction indicated by the arrow.

*l* indicates a guide for guiding the fruit into the buckets *j'*. This guide preferably consists of a board set aslant above the discharge end of the washer and held in the slanting position by suitable resilient means, such as the spring *m*.

The screw may be driven by any suitable means.

*n* indicates a bevel-wheel fastened to the shaft *b''* of the brush-screw. *o* indicates a bevel-wheel meshing therewith and driven by a spur-wheel *p*, which in turn is driven by a spur-wheel *q*, which brings the driving mechanism to the top of the tank *d*.

*r* indicates a partition to prevent the fruit from coming into contact with the screw-rotating mechanism.

The door *h* is hinged at the top at *h'* to swing in the direction of the dotted arrow, and it prevents the fruit from working to the discharge end underneath the cylinder when the worm *b* is at rest.

The door *h* can be raised whenever it is desired to cleanse the bottom of the tank *d* from the dirt and sediment which accumulates in the process of operating the machine.

*s* indicates a manhole at the lower end of the feed end of the machine. When it is desired to cleanse the tank, the manhole *s* will be opened, the door *h* will be raised, and the operator will scrape and wash out the sediment from the bottom of the tank.

Preferably the oranges and lemons will be fed into the upper end of the tank through a spout *t* at one side of the tank just back of the partition *i*.

*u* indicates an upward extension of the brush-surface cylinder on the side of the cylinder opposite the trough *t*, through which the fruit is fed into the tank. This apron or extension *u* prevents the fruit from being thrown away from the screw after it has been engaged thereby, thus causing it to be directed into the hollow cylinder.

In practical operation the fruit will be fed into the tank over the trough *t* and will fall into the water, where it will be caught by the screw and, together with a large volume of water, will be carried through the cylinder and discharged at the lower end. There the oranges or lemons will rise and be caught by the buckets *j'* of the elevator, and will thence be carried up and dumped onto the grating *k*, whence they will pass out over the side of the tank.

The cylinder of the wet brusher is preferably made of two flanged semicylindrical trough-like sections 2 3, of sheet metal, the flanges of which are fitted together and rest on cleats *v*, fastened aslant to the side walls of the tank, and inside of said shell are fixed the brushes proper, *w*, formed of wooden bodies furnished with bristles in the customary manner of making bristle-brushes. The side flanges *a''* of the semicylindrical members 2 3 are fastened by bolts 4, passed upward through said cleats and through said flanges and through cleats *v'*, which are placed upon the top of said flanges and there fastened by means of nuts 5 on the bolts 4.

In the dry brusher the hollow brush-cylinder is preferably formed of two trough-like members 2' 3', the upper one of which is fastened on top of the two side bars 6 6' of the supporting-frame. The side bars are concaved on their inner sides and supplied with brushes to constitute a part of the brush-cylinder. The under trough-shaped member 3' of the cylinder is hinged at one side to one of the bars 6 by a hinge 7 and is fastened to the other side bar by a suitable fastening, such as the bolts and nuts 9.

*x* indicates a grating above the front end of the cylinder *a* of the washer to prevent the fruit from floating away from the elevator *j*.

In Fig. I four oranges are shown in different positions on their way out of the machine. The floor *k* is preferably a slanting grating leading out of the machine to discharge the fruit at one side.

In the dry brusher a trough $y$ is provided to direct the fruit from the discharge end of the brusher into a box $z$.

10 and 11 indicate pulleys for driving the screw brush conveyer. It is to be understood that any suitable means may be used for applying the power to turn the screw.

The elevator $j$ is driven by sprocket-chain 12, which is connected to be driven by the pulley 10. The elevator is connected to be driven from the machinery which drives the screw, so that its speed will be governed by the speed of the brushing and washing appliance in the tank.

Any clogging of the machine with the cleaned fruit is obviated.

In the dry brusher a trough $t'$ is let into one side of the hollow brush-cylinder, through which to feed the fruit to the conveyer-screw.

I do not limit my invention to the exact construction shown, for the reason that the cylinder and the conveyer may be differently constructed and arranged, and the several parts shown in the drawings may be differently arranged and some of them may be omitted within the judgment and to serve the convenience of the constructor or user without destroying the efficiency of the machine or departing from the spirit of the invention. I believe, however, that the form and arrangement shown and described herein is the best and most efficient form in which I have contemplated carrying out my invention.

It is to be understood that when the screw is in operation the water-level at the right end of the tank in Fig. I will lower and that at the left end will be raised more or less, depending upon the difference between the speed of the stream through the cylinder in one direction and beneath the cylinder in the other direction.

13 indicates a hose to supply water to the water-tank, and 14 indicates an overflow-pipe to keep the water at the appropriate level.

What I claim, and desire to secure by Letters Patent of the United States, is—

1. An orange-washer comprising a water-tank; a hollow cylinder set aslant in the water-tank and furnished with an internal cylindrical brush-surface; a screw conveyer having brush-surfaces and rotating in said cylinder to convey the fruit downward through the cylinder; and an elevator mounted above the lower end of the cylinder to discharge the fruit from the machine.

2. An orange and lemon cleaner comprising a water-tank; a hollow brush-cylinder in the water-tank; a brush screw conveyer in the cylinder; and a rotary elevator in the tank above the discharge end of the cylinder to gather the fruit and discharge it from the machine.

3. In a fruit-cleaner, the combination of a water-tank; a hollow brush-cylinder set aslant in the water-tank; a brush screw conveyer to rotate in the hollow brush-cylinder; a screen below the discharge end of the cylinder; and a rotary elevator above the discharge end of the cylinder.

4. A fruit-cleaner comprising a water-tank; a hollow brush-cylinder set aslant in the water-tank; a brush screw conveyer to rotate in the brush-cylinder; a rotary elevator in the tank above the discharge end of the cylinder; and a spring-pressed guide to guide the fruit onto the buckets of the rotary elevator.

5. In an orange and lemon cleaner, the combination of a water-tank; a hollow brush-cylinder mounted aslant in the tank; a brush screw conveyer in the cylinder to convey fruit through the cylinder and discharge it at its lower end; and a water-wall above the cylinder to prevent the return of the water over the cylinder toward the feed end.

6. In an orange and lemon cleaner, the combination of a water-tank; a hollow brush-cylinder set aslant in the water-tank; a brush screw conveyer to rotate in the brush-cylinder; a water-wall in the tank above the cylinder; a screen in the tank below the discharge end of the cylinder; and a screen in the tank below the cylinder and near the feed end thereof.

7. The combination of the water-tank; a hollow brush-cylinder located in the water-tank the inner surface of said hollow cylinder being a brush-surface; a screw conveyer to convey fruit through the cylinder within the tubular brush formed thereby; and an elevator in the tank at the discharge end of the cylinder to discharge fruit from the tank.

8. The combination of a water-tank; a hollow brush-cylinder set aslant in the water-tank; a screw conveyer for conveying fruit through the cylinder; means in the tank for driving the shaft of the screw conveyer; and a partition in the tank between the screw conveyer and such means.

9. The combination of a water-tank; a hollow cylinder in the tank furnished with a side extension at one end and a brush screw conveyer to rotate in the cylinder, and extending beneath the side extension.

10. The combination of a water-tank; a hollow brush-cylinder in the tank and furnished at one end with a side extension; a screw brush conveyer in the cylinder and extending beneath the side extension; and means for rotating the screw conveyer to convey fruit through the cylinder from the end having the side extension.

11. In a fruit-cleaner, the combination of a water-tank; cleats set aslant on the opposite sides of the tank-walls; a semicylindrical trough with internal brush-surface and side flanges, set with the flanges resting on the cleats respectively; an inverted semicylindrical trough with internal brush-surface and with side flanges set on the flanges of the first-named trough; and cleats to hold the flanges in place, thus forming a hollow brush-cylinder substantially as and for the purpose set forth.

In testimony whereof I have signed my name to this specification, in the presence of two subscribing witnesses, at Los Angeles, California, this 27th day of October, 1900.

JAMES T. HALEY.

Witnesses:
JAMES R. TOWNSEND,
JULIA TOWNSEND.